(12) United States Patent
Bardin et al.

(10) Patent No.: US 10,360,134 B2
(45) Date of Patent: Jul. 23, 2019

(54) SYSTEM, METHOD AND COMPUTER PROGRAM PRODUCT FOR DETECTING INFEASIBLE EVENTS IN DYNAMIC PROGRAMS

(71) Applicant: COMMISSARIAT A L'ENERGIE ATOMIQUE ET AUX ENERGIES ALTERNATIVES, Paris (FR)

(72) Inventors: Sébastien Bardin, L'Hay-les-Roses (FR); Robin David, Bourg-la-Reine (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 15/798,671

(22) Filed: Oct. 31, 2017

(65) Prior Publication Data

US 2019/0129825 A1    May 2, 2019

(51) Int. Cl.
*G06F 9/44* (2018.01)
*G06F 11/36* (2006.01)
*G06F 8/41* (2018.01)

(52) U.S. Cl.
CPC .......... *G06F 11/3612* (2013.01); *G06F 8/433* (2013.01)

(58) Field of Classification Search
CPC ........................................................ G06F 9/44
USPC ................................................. 717/132–140
See application file for complete search history.

(56) References Cited

U.S. PATENT DOCUMENTS

| 5,428,786 A * | 6/1995 | Sites | G06F 8/52 717/151 |
|---|---|---|---|
| 2005/0138474 A1 * | 6/2005 | Jain | G01R 31/31703 714/30 |
| 2011/0138369 A1 * | 6/2011 | Chandra | G06F 9/4491 717/133 |
| 2014/0130019 A1 * | 5/2014 | Beskrovny | G06F 8/74 717/131 |

OTHER PUBLICATIONS

B. Yadegari et al., "Symbolic execution of obfuscated code," in CCS 2015, ACM, 2015.
B. Yadegari et al., "A generic approach to automatic deobfuscation of executable code," 2015 IEEE Symposium on Security and Privacy, May 2015, pp. 674-691.

* cited by examiner

*Primary Examiner* — Jae U Jeon
(74) *Attorney, Agent, or Firm* — Baker & Hostetler LLP

(57) ABSTRACT

A computer-implemented method for determining infeasible conditions is disclosed. The method comprises executing a backward-bounded symbolic analysis on a control flow graph of a dynamic program.

16 Claims, 3 Drawing Sheets

```
<main>:                    <even(int a)>:
x = input()                if (a % 2 == 0) {
y = input()                   res = 1
x' = 7*(x*x)               }
result = even(y)           else {
y' = y*y                      res = 0
x" = x'-1                  }
if (result) { ①           return res
  if(x" ≠ y'){ ②
    //always taken
  }
  else {//dead }
}
else {
  ...
}
```

SYSTEM, METHOD AND COMPUTER PROGRAM PRODUCT FOR DETECTING INFEASIBLE EVENTS IN DYNAMIC PROGRAMS

FIELD OF THE INVENTION

The present invention relates to the field of software analysis and more particularly relates to a system, method and computer program product for detecting infeasible events or conditions in dynamic programs.

BACKGROUND ART

Obfuscation is a prevalent practice aiming at protecting some functionalities or properties of a program. Yet, while its legitimate final goal is link to intellectual property protection, obfuscation is widely used for malicious purposes. The transformations applied to a program aim at hiding the real program behavior. While approaches such as virtualization or junk insertion make instructions more complex to understand, other approaches directly hide the legitimate instructions of the programs, thereby making a reverser (or a disassembler) missing essential parts of the code while wasting its time in dead code. The latter category includes for example code overlapping, self-modification, opaque predicates and call stack tampering. Therefore, software deobfuscation is a crucial task in reverse-engineering, especially for malware analysis.

Standard disassembly approaches are essentially divided into "static methods" and "dynamic methods". On one hand, static (or syntactic) disassembly tools such as the known IDA or Objdump ones have the potential to cover the whole program. Nonetheless, they are easily fooled by obfuscations such as code overlapping, opaque predicates, opaque constants, call stack tampering and self-modification. On the other hand, dynamic analysis covers only a few executions of the program and might miss both significant parts of the code and crucial behaviors. While standard static and dynamic disassembly approaches suffer from those well-known short-comings (i.e. standard program analysis techniques cannot deal with dynamic code), an interesting alternative named "Dynamic Symbolic Execution" (DSE) has recently been proposed as being more robust than static analysis and more complete by covering more instructions than dynamic analysis. The following references relate to DSE:

B. Yadegari and S. Debray, "Symbolic execution of obfuscated code," in CCS 2015, ACM, 2015.

B. Yadegari, B. Johannesmeyer, B. Whitely, and S. Debray, "A generic approach to automatic deobfuscation of executable code," in SP 2015, May 2015.

While the authors use dynamic and symbolic execution in order to discover more parts of the code under analysis, and can deal with dynamic code (assembly code, executable code, javascript, etc.), these approaches cannot prove infeasibility.

Dynamic disassembly methods only address reachability issues, namely feasibility questions, verifying that certain events or setting can occur, e.g. that an instruction in a code is indeed reachable. However, many issues or questions arising during reversing tasks are infeasibility questions, e.g. detecting protection schemes such as opaque predicates which fall into the category of infeasibility questions. The infeasibility issues are currently a blind spot of both standard and advanced disassembly methods.

Dynamic analysis and DSE do not address this issue because they only consider a finite number of paths in the control-flow graph of a program to be disassembled, while infeasibility is about considering all paths. Recovering the most accurate control-flow graph of a program under analysis, i.e. recovering all instructions and branches, is the first step of deobfuscation. This step is already challenging for non-obfuscated codes due to tricky low-level constructs like indirect control flow (computed jumps, jmp eax) or to the interleaving of code and data. This operation gets largely worst in the case of obfuscated codes. And currently, only dynamic analysis and DSE are robust enough to address heavily obfuscated codes.

Moreover at first sight, infeasibility could be considered as a simple mirror of feasibility. However from an algorithmic point of view they are not the same. Indeed, since solving feasibility questions on general programs is undecidable, practical approaches have to be one-sided, favoring either feasibility (i.e., answering "feasible" or "don't know") or infeasibility (i.e., answering "don't know" or "infeasible"). While there currently exist robust methods for answering feasibility questions on heavily obfuscated codes, no such method exist for infeasibility questions.

There is thus a need for a solution to address the problem of infeasibility conditions or events in programs, and particularly to address infeasibility questions encountered during reversing tasks of obfuscated code. The present invention offers a solution to this need.

SUMMARY OF THE INVENTION

Accordingly, an aspect of the invention is to provide a method for detecting infeasible events in programs, i.e. checking that certain events or settings cannot occur. The method may be used either for detecting obfuscation schemes, e.g. detecting that a branch is dead, or proving an absence, e.g. proving that a computed jump cannot lead to an improper address.

Another aspect of the present invention is to provide a method for automatically solving infeasibility questions occurring during the reversing of obfuscated programs (deobfuscation). Advantageously, the method is applicable to dynamic code. A dynamic code as intended with the present invention may encompass assembly code, executable code, javascript, and any other form where a whole code is not entirely visible from the initial textual description of the code, i.e. where all instructions are not known a priori.

Advantageously the method of the invention is precise (low rates of false positives and false negatives), efficient (being able to scale on realistic codes in terms of size) and robust (being able to scale on realistic codes in terms of protection, including self-modification).

Still advantageously, the method is generic by addressing a large panel of infeasibility issues or deobfuscation-related questions such as opaque predicates, call stack tampering or self-modification.

The present invention is applicable to malware analysis, reverse engineering, testing or verification to name a few of the applications that could take advantage of detecting infeasible events in programs.

To achieve the foregoing object, a system, method and computer program product as further described in the appended independent claims 1, 16 and 17 are provided.

Particularly, a computer-implemented method for determining infeasible conditions comprising executing a backward-bounded symbolic analysis on a control flow graph of a dynamic program is disclosed.

In an aspect, the step of executing a backward-bounded symbolic analysis comprises:

defining a reachability condition and a backward bound in the control flow graph, wherein nodes of the control flow graph represent instructions of the dynamic program and branches represent links between instructions; and performing a reachability analysis on predecessors instructions of the reachability condition, up to the backward bound.

In another aspect, the step of performing a reachability analysis comprises:

determining a set of predecessors of the reachability condition back to the backward bound;

generating a symbolic representation of the set of predecessors; and executing an emptiness-check over said symbolic representation to determine emptiness or not of the set of predecessors.

According to various aspects:

the method may further comprise outputting the result of the emptiness check;

the result of the emptiness check represents an infeasible condition or an unknown condition;

the symbolic representation of the set of predecessors is a logical formula and the emptiness-check is performed via an automatic or semi-automatic solver;

the solver is a SMT or a SAT solver;

the symbolic representation of the set of predecessors is an automata-based structure and the emptiness-check is performed via a language emptiness-check;

the automata-based structure is chosen in the group of finite automata, Büchi automata or BDDs;

the method further comprises an initial step of generating a control flow graph of the dynamic program;

the control flow graph is generated with a static analysis of the dynamic program;

the control flow graph is generated with a dynamic analysis of the dynamic program;

the method further comprises after the output of the conditions, disassembling the control flow graph except for the links identified as infeasible;

the initial backward bound is adjusted regarding the number of data-dependencies, the size and/or complexity of the symbolic representation, the number of instructions for example;

the reachability conditions are instantiated to reflect classes of code protection such as opaque predicates and call stack tampering.

Another aspect of the invention is a computer program product, the computer program product comprising a computer-readable storage medium having computer executable instructions embodied therewith, the computer executable instructions being executable by a processor to cause the processor performs a method for determining infeasible conditions comprising at least executing a backward-bounded symbolic analysis on a control flow graph of a dynamic program.

The invention further address a computer system comprising:

a memory having computer executable instructions and a dynamic program of an application; and a processor for executing the computer executable instructions, wherein execution of the computer executable instructions causes the processor to execute at least a backward-bounded symbolic analysis on a control flow graph of the dynamic program to determine infeasible conditions.

A disassembly device may comprise a computer system as claimed.

Further aspects of the invention will now be described, by way of preferred implementation and examples, with reference to the accompanying figures.

BRIEF DESCRIPTION OF THE DRAWINGS

The above and other items, features and advantages of the invention will be better understood by reading the following more particular description of the invention in conjunction with the figures wherein.

DETAILED DESCRIPTION OF THE INVENTION

Figure 1:
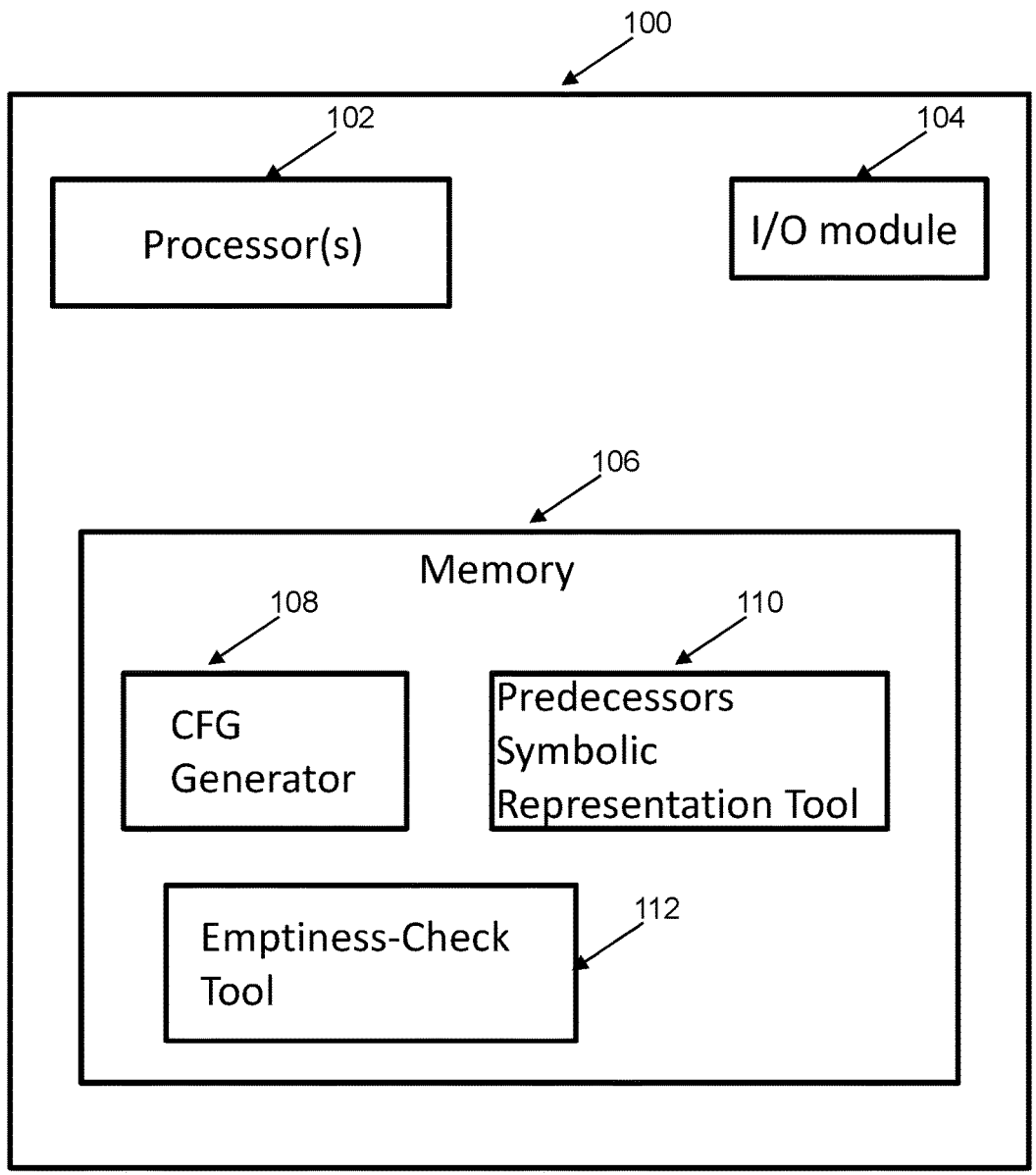
FIG. 1 shows a block diagram of an apparatus in accordance with some embodiment of the present invention.

Embodiments of the invention are generally directed to systems, methods, and computer program products for determining infeasible conditions in dynamic programs.

For the purposes of this application, the following terms have the respective meanings set forth below:

Disassembly: one call legit an instruction in a binary if it is executable in practice. Two expected qualities for disassembly are (1) soundness: does the algorithm recover only legit instructions?, (2) completeness: does the algorithm recover all legit instructions? Standard approaches include linear sweep, recursive disassembly and dynamic disassembly. Recursive disassembly statically explores the executable file from a given (list of) entry point(s), recursively following the possible successors of each instruction. This technique may miss a lot of instructions, typically due to computed jumps (jmp eax) or self-modification. The approach is also easily fooled into disassembling junk code obfuscated by opaque predicates or call stack tampering. As such, the approach is neither sound nor complete. Linear sweep linearly decodes all possible instructions in the code sections. The technique aims at being more complete than recursive traversal, yet it comes at the price of many additional misinterpreted instructions. Meanwhile, the technique can still miss instructions hidden by code overlapping or self-modification. Hence the technique is unsound, and incomplete on obfuscated codes. Dynamic disassembly retrieves only legit instructions and branches observed at runtime on one or several executions. The technique is sound, but potentially highly incomplete yet, it does recover part of the instructions masked by self-modification, code overlapping, etc. For example, while Objdump is solely based on linear sweep, IDA performs a combination of linear sweep and recursive disassembly (geared with heuristics).

Dynamic Symbolic Execution (DSE) (also known as concolic execution) is a formal technique for exploring program paths in a systematic way. For each path $\pi$, the technique computes a symbolic path predicate $\phi_\pi$ as a set of constraints on the program input leading to follow that path at runtime. Intuitively, $\phi_\pi$ is the conjunction of all the branching conditions encountered along path $\pi$. This path predicate is then fed to an automatic solver (typically a SMT solver). If a solution is found, it corresponds to an input data exercising the intended path at runtime. Path exploration is then achieved by iterating on all (user-bounded) program paths, and paths are discovered lazily thanks to an interleaving of dynamic execution and symbolic reasoning. Finally, concretization allows performing relevant under approximations of the path predicate by using the concrete information available at runtime. The main advantages of DSE are correctness (no false negative in theory, a bug reported is a bug found) and robustness (concretization does allow to handle unsupported features of the program under analysis without losing correctness). Moreover, the approach is easy to adapt to binary code, compared to other formal methods. The very main drawback of DSE is the so-called path explosion problem: DSE is doomed to explore only a portion of all possible execution paths. As a direct consequence, DSE is incomplete in the sense that it can only prove that a given path (or objective) is feasible (or coverable), but not that it is infeasible. DSE is interesting for disassembly and deobfuscation since it enjoys the advantages of dynamic analysis (especially, sound disassembly and robustness to self-modification or code overlapping), while being able to explore a larger set of behaviors. Yet, while on small examples DSE can achieve complete disassembly, it often only slightly improves coverage on large and complex programs.

Obfuscation: Transformations that aim at hiding the real program behavior. While approaches such as virtualization or junk insertion make instructions more complex to understand, other approaches directly hide the legitimate instructions of the programs making the reverser (or the disassembler) missing essential parts of the code while wasting its time in dead code. The latter category includes for example code over lapping, self-modification, opaque predicates and call stack tampering.

Opaque predicate: an opaque predicate always evaluates to the same value, and this property is ideally difficult to deduce. The infeasible branch will typically lead the reverser (or disassembler) to a large and complex portion of useless junk code. Table 1 below shows the x86 encoding of the opaque predicate $7y^2-1 \neq x^2$ as generated by the known O-LLVM obfuscation tool. This condition is always false for any values of DS:X, DS:Y, so the conditional jump jz<addr_trap> is never going to be taken.

| | |
|---|---|
| mov | eax, ds:x |
| mov | ecx, ds:y |
| imul | ecx, ecx |
| imul | ecx, 7 |
| sub | ecx, 1 |
| imul | eax, eax |
| cmp | ecx, eax |
| jz | <addr_trap> //false jump to junk |
| .... | ........ //real code |

Call stack tampering: a (call) stack tampering, or call/ret violation, consists in breaking the assumption that a ret instruction returns to the instruction following the call (return site), as exemplified in Table 2 below. The benefit is twofold: the reverser might be lured into exploring useless code starting from the return site, while the real target of the ret instruction will be hidden from static analysis.

| <main>: | <fun>: |
|---|---|
| call <fun> | [...] |
| ..... // return site | push x |
| ..... // junk code | ret // jump to x instead |
| ..... // junk code | // of return site |

Referring first to FIG. 1, an apparatus 100 in accordance with some exemplary embodiments of the disclosed subject matter is shown. In some exemplary embodiments, apparatus 100 may be configured to perform backward-bounded symbolic analysis execution of a dynamic program in accordance with the present invention. Apparatus 100 may comprise one or more processor(s) 102. Processor 102 may be a Central Processing Unit (CPU), a microprocessor, an electronic circuit, an Integrated Circuit (IC) or the like. Processor 102 may be utilized to perform computations required by apparatus 100 or any of it subcomponents. In some exemplary embodiments, apparatus 100 may comprise an Input/Output (I/O) module 104. I/O module 104 may be utilized to provide an output to and receive input from a user, a computerized apparatus or another apparatus similar to apparatus 100. In some embodiments, the I/O module may receive a dynamic program of an application, and may output results of the execution of the method of FIG. 2. In some exemplary embodiments, apparatus 100 may comprise a memory 106. Memory 106 may be a Hard Disk Drive, a Flash disk, a Random Access Memory (RAM), a memory chip, or the like computer-readable storage medium. Memory 106 may retain machine executable instructions operative to cause processor 102 to perform acts associated with any of the subcomponents of apparatus 100.

Control Flow Graph (CFG) generator 108 may be configured to execute a program analysis and provide a representation, using graph notation, of all paths that might be traversed through a program during its execution. The nodes of the control flow graph represent instructions and the branches (or edges) represent links between the instructions.

Predecessors Symbolic Representation Tool 110 may be configured to generate a symbolic representation for all predecessors instructions of a target condition that are gathered along a control flow graph up to a bound 'k' defined for the backward analysis.

Emptiness-Check Tool 112 may be configured to receive the symbolic representation, execute an emptiness-check and provide an answer as output. In some embodiments, the Emptiness-check Tool may be configured as a Satisfiability (SAT) solver or as a Satisfiability Modulo Theories (SMT) solver.

Figure 2:
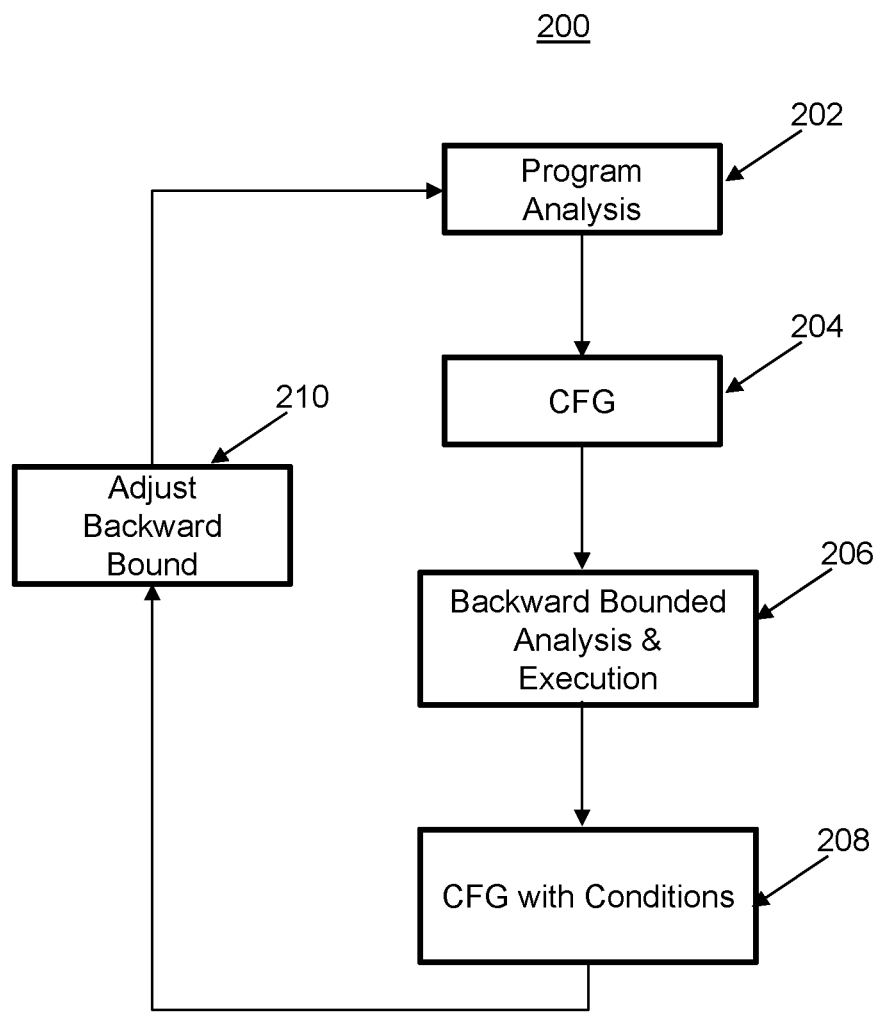
FIG. 2 shows a flow diagram in accordance with some embodiment of the present invention.

In some exemplary embodiments, apparatus 100 may be configured to perform the method of FIG. 2. The present invention may be a system, a method, and/or a computer program product. The computer program product may include a computer-readable storage medium (or media) having computer-readable program instructions thereon for causing a processor to carry out aspects of the present invention. The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CDROM), a digital versatile disk (DVD), a memory stick, a floppy disk, a mechanically encoded device such as punch cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device. Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions. These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks. The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Going to FIG. 2, a flow chart in accordance with some exemplary embodiments of the present invention is now described. The flowchart 200 and block diagrams in the figure illustrate the architecture, functionality, and operation of possible implementations of systems, methods, and computer program products according to various embodiments of the present invention. In this regard, each block in the flowchart or block diagrams may represent a module, unit, segment, or portion of instructions, which comprises one or more executable instructions for implementing the specified logical function(s).

Considering a binary-level program P with a given initial code address '$a_0$', a state $s \triangleq (a,\sigma)$ of the program is defined by a code address 'a' and a memory state '$\sigma$', which is a mapping from registers and memory to actual values (bit-vectors, typically of size 8, 32 or 64). By convention, '$S_0$' represents an initial state, i.e., $S_0$ is of the form ($a_0$, $\sigma$). The transition from one state to another is performed by the post function that executes the current instruction. An execution $\pi$ is a sequence $\pi_s \triangleq (s_0 \bullet s_1 \bullet \ldots \bullet s)$, where $S_{j+1}$ is obtained by applying the post function to Sj ($S_{j+1}$) being the successor of $S_j$). Considering a predicate $\varphi$ over memory states, a reachability condition is a pair $c \triangleq (a,\varphi)$, with 'a' a code address. Such a condition 'c' is feasible if there exists a state $s \triangleq (a,\sigma)$ and an execution $\pi_s \triangleq (s_0 \bullet s_1 \bullet \ldots \bullet s)$ such that '$\sigma$' satisfies '$\varphi$', denoted '$\sigma \models \varphi$'. It is said infeasible otherwise. A feasibility (respectively infeasibility) question consists in trying to solve the feasibility (respectively the infeasibility) of such a reachability condition. While these definitions do not take self-modification into account, they can be extended to such a setting by considering code addresses plus waves or phases.

On step 202, a dynamic program is analyzed to generate a control flow graph (CFG) 204. Generally most of the graphs generated are partial control flow graph (P-CFG). In some embodiments, the control flow graph is generated by a static analysis tools. Alternatively, the control flow graph may be generated by a dynamic analysis tool. A program is told dynamic when the whole code is not entirely visible from the initial textual description of the code and may cover assemble code, executable code (binary-level), javascript, etc.

Figures 3, 4:
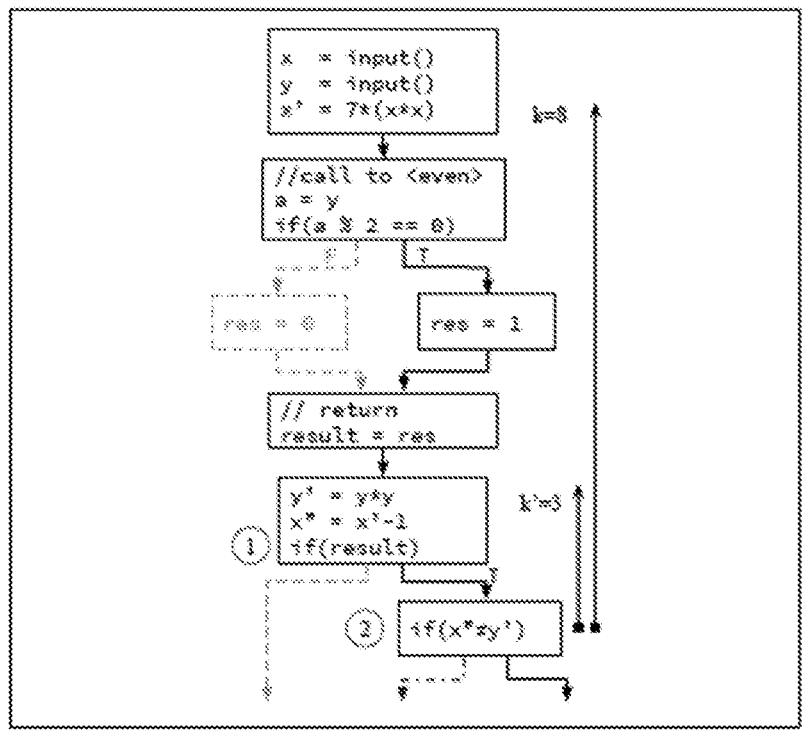
FIG. 3 shows an exemplary pseudo-code program.
FIG. 4 shows an exemplary partial control flow graph of the pseudo-code program of FIG. 3.

When the control flow graph of the program is available, the method enters a backward bounded analysis and execution 206. Generally speaking, the principle of the present invention is to perform a pre operation, i.e. a backward reasoning from successors to predecessors. The process relies on computable bounded reasoning, namely $pre^k$, collecting all predecessors of a given state or condition in 'k' steps (k-predecessors). Given a reachability condition 'c', the process allows checking if $pre^k(c) = \emptyset$ to determine whether 'c' is infeasible (unreachable). Thus, performing a reachability analysis comprises first determining a set of predecessors of the reachability condition back to the backward bound, followed by generating a symbolic representation of the set of predecessors, and executing an emptiness-check over the symbolic representation to determine emptiness or not of the set of predecessors. Indeed, if a condition has no k-predecessor, it has no k'-predecessor for any k'>k and cannot be reached. Hence, $pre^k$ can answer positively to infeasibility queries. Yet, symmetry does not hold anymore, as $pre^k$ cannot falsify infeasibility queries, because it could happen that a condition is infeasible for a reason beyond the bound 'k'. The examples described in relation to FIGS. 3 and 4 give an illustration of such a situation, where in this case, a false negative (FN) i.e. reachability condition wrongly identified as feasible because of a too-small defined 'k'.

Checking whether $pre^k(c)=\emptyset$ is done in a symbolic way. The set $pre^k$ is computed implicitly as a symbolic representation. In some embodiments, the symbolic representation of the set of predecessors is a logical formula and the emptiness-check is performed via an automatic or semi-automatic solver. The formula is passed to the automatic solver. The solver is asked for a solution to the query represented by the logical formula, which is unsatisfiable or infeasible if the set is empty, otherwise is unknown. The solver may be a SMT or a SAT solver, such as Z3. In some embodiments, the symbolic representation of the set of predecessors is an automata-based structure and the emptiness-check is performed via a language emptiness-check. The automata-based structure may be chosen in the group of finite automata, Büchi automata or BDDs (Binary-Decision Diagrams). Advantageously, the computation does not depend on the program size but on the user-chosen bound 'k'.

After the backward-bounded symbolic analysis is done, the method allows providing the (partial) control flow graph with annotations/information 208 representing the answers of the solver.

Thus, considering reachability condition $(a, \varphi)$, the backward bounded method starts with a dynamic execution $\pi$:

if $\pi$ reaches code address 'a', then the process allows computing $pre_\pi^k((a,\varphi))|$ as a formula and solving it:
if it is UNSAT, then outputting the result of INFEASIBLE;
if it is SAT, then outputting the result of UNKOWN;
if it is TO (for timeout), then outputting the result TO;
otherwise if $\pi$ does not reach code address 'a' the result output is UNKOWN.

Finally, it is appreciated that the backward bounded process is efficient (depends on 'k' and not on the trace or program length), and is robust as dynamic analysis.

In some embodiments, the method allows improving the (partial) control flow graph recovery by going back to the beginning step 202, taking infeasibility information into account. The method may use a static disassembly tool that does not disassemble branches of the control flow graph that are marked as infeasible (infeasible branch meaning the corresponding code is dead).

In some embodiments, the backward bound may be initially user-defined and set as a discrete value, and automatically adjusted during iteration (step 210) of the method regarding the number of data-dependencies, the size and/or complexity of the symbolic representation, the number of instructions for example.

Moreover, if new opportunities for dynamic code are found, the method pursue with step 206.

Yet, backward reasoning is very fragile at binary-level, since computing a precise CFG may be highly complex because of dynamic jumps or self-modification. In some embodiments, the $pre^k$ reasoning is combined with dynamic traces, so that the whole approach benefits from the robustness of dynamic analysis. The $pre^k$ is computed with respect to a control-flow graph induced by a given trace $\pi$ in a dynamic disassembly manner. This sliced $pre^k$ is denoted $pre_\pi^k$. Hence, the method is robust, yet since some parts of $pre^k$ may be missing from $pre_\pi^k$, the method loses correctness and may have false positive (FP), i.e. reachability conditions wrongly identified as infeasible, additionally to the false negative FN due to "boundedness" (because of too small 'k').

Going now to FIG. 3, a simple pseudo-code program of a toy example is used to illustrate the backward bounded method of the present invention along with the impact of the bound 'k' and of the (set of) dynamic traces on FP and FN. FIG. 3 shows the pseudo-code program, where branch condition x"≠y' always evaluate to true (i.e. an opaque predicate) as it encodes condition $7x^2-1 \neq y^2$ on the program input x and y. The two other branch conditions can evaluate to both true and false, depending on the input.

FIG. 4 shows a partial control flow graph obtained by a dynamic execution on the toy example pseudo-code program of FIG. 3, where the call to function 'even' is inlined for simplicity. Considering two traces: $\pi_1$ covers bold edges (true, true), and $\pi_2$ covers dash edges (false, false). Suppose one wants to use the backward-bounded method to prove that branch condition (2) is indeed opaque, i.e., that x"=y' is infeasible at program location (2). The method goes backward from program location (2) and predicate x"=y", and gathers back all dynamic suffixes up to bound 'k'. Considering only trace $\pi_1$ (bold edges) and k=8, after substitution, the process provides:

$pre_{\pi_1}^k \triangleq 7x^2-1=y^{2\hat{}}$ result=1^ result≠0 y %2=0, which is UNSAT, as $7x^2-1=y^2$ is UNSAT. Hence, branch condition (2) is indeed proved opaque.

In the case where one consider also $\pi_2$, then
$pre_{\pi_1\pi_2}^k \triangleq (7x^2-1=y^2)\hat{}((y \% 2=0\hat{}$ result=1^ result≠0)V(y % 2≠0^ result=0^ result=0)), where $pre_{\pi_1\pi_2}^k$ is obtained by simplifying the disjunction of both formulas $pre_{\pi_1}^k$ and $pre_{\pi_2}^k$. It is easy to see that is also UNSAT. Once again, branch condition (2) is successfully proved opaque.

It is appreciated that while the example is described for reachability conditions instantiated as to reflect the class of code protection of opaque predicates (i.e. proving a branch is not feasible), the method may be used for reachability conditions instantiated as to reflect the class of code protection of call stack tampering (i.e. proving a return instruction always go back to its caller instruction).

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A computer-implemented method for determining infeasible conditions comprising executing a backward-bounded symbolic analysis on a control flow graph of a dynamic program, wherein executing a backward-bounded symbolic analysis comprises:
   defining a reachability condition and a backward bound in the control flow graph, wherein nodes of the control flow graph represent instructions of the dynamic program and branches represent links between instructions; and
   performing a reachability analysis on predecessors instructions of the reachability condition, up to the backward bound, and wherein performing the reachability analysis comprises:
      determining a set of predecessors of the reachability condition back to the backward bound;
      generating a symbolic representation of the set of predecessors; and
      executing an emptiness-check over said symbolic representation to determine emptiness or not of the set of predecessors.

2. The method of claim 1, further comprising outputting the result of the emptiness check.

3. The method of claim 2, wherein the result of the emptiness check represents an infeasible condition or an unknown condition.

4. The method of claim 3, further comprising after the output of the conditions, disassembling the control flow graph except for the links identified as infeasible.

5. The method of claim 4, wherein the initial backward bound is adjusted regarding the number of data-dependencies, the size and/or complexity of the symbolic representation, the number of instructions for example.

6. The method of claim 1, wherein the symbolic representation of the set of predecessors is a logical formula and the emptiness-check is performed via an automatic or semi-automatic solver.

7. The method of claim 6, wherein the solver is a SMT or a SAT solver.

8. The method of claim 1, wherein the symbolic representation of the set of predecessors is an automata-based structure and the emptiness-check is performed via a language emptiness check.

9. The method of claim 8, wherein the automata-based structure is chosen in the group of finite automata, Buchi automata or BDDs.

10. The method of claim 1, further comprising an initial step of generating a control flow graph of the dynamic program.

11. The method of claim 10, wherein the control flow graph is generated with a static analysis of the dynamic program.

12. The method of claim 10, wherein the control flow graph is generated with a dynamic analysis of the dynamic program.

13. The method of claim 1, wherein the reachability conditions are instantiated to reflect classes of code protection such as opaque predicates and call stack tampering.

14. A computer program product, the computer program product comprising a non-transitory computer-readable storage medium having computer executable instructions embodied therewith, the computer executable instructions being executable by a processor to
   cause the processor performs a method for determining infeasible conditions comprising at least executing a backward-bounded symbolic analysis on a control flow graph of a dynamic program, wherein executing a backward-bounded symbolic analysis comprises:
      defining a reachability condition and a backward bound in the control flow graph, wherein nodes of the control flow graph represent instructions of the dynamic program and branches represent links between instructions; and
      performing a reachability analysis on predecessors instructions of the reachability condition, up to the backward bound, and wherein performing the reachability analysis comprises:
         determining a set of predecessors of the reachability condition back to the backward bound;
         generating a symbolic representation of the set of predecessors; and
         executing an emptiness-check over said symbolic representation to determine emptiness or not of the set of predecessors.

15. A computer system comprising:
   a memory having computer executable instructions and a dynamic program of an application; and
   a processor for executing the computer executable instructions, wherein execution of the computer executable instructions causes the processor to execute at least a backward-bounded symbolic analysis on a control flow graph of the dynamic program to determine infeasible conditions, wherein executing a backward-bounded symbolic analysis comprises:
      defining a reachability condition and a backward bound in the control flow graph, wherein nodes of the control flow graph represent instructions of the dynamic program and branches represent links between instructions; and
      performing a reachability analysis on predecessors instructions of the reachability condition, up to the backward bound, and wherein performing the reachability analysis comprises:
         determining a set of predecessors of the reachability condition back to the backward bound;
         generating a symbolic representation of the set of predecessors; and
         executing an emptiness-check over said symbolic representation to determine emptiness or not of the set of predecessors.

16. A disassembly device comprising the computer system as claimed in claim 15.

* * * * *